US012079657B2

(12) United States Patent
Lee (10) Patent No.: US 12,079,657 B2
(45) Date of Patent: Sep. 3, 2024

(54) HANDLING OWNERSHIP OF PROCESS THREADS

(71) Applicant: Hewlett Packard Enterprise Development LP, Houston, TX (US)

(72) Inventor: Man-Ho Lawrence Lee, Milipitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 547 days.

(21) Appl. No.: 17/356,607

(22) Filed: Jun. 24, 2021

(65) Prior Publication Data
US 2022/0413898 A1  Dec. 29, 2022

(51) Int. Cl.
*G06F 9/48* (2006.01)
(52) U.S. Cl.
CPC ............ *G06F 9/485* (2013.01); *G06F 9/4881* (2013.01)
(58) Field of Classification Search
CPC ........ G06F 9/485; G06F 9/4881; G06F 9/524; G06F 9/4812
See application file for complete search history.

(56) References Cited

U.S. PATENT DOCUMENTS

| | | | |
|---|---|---|---|
| 6,505,229 B1 * | 1/2003 | Turner | G06F 9/3851 718/107 |
| 7,140,022 B2 | 11/2006 | Binns | |
| 7,418,585 B2 | 8/2008 | Kissell | |
| 9,189,230 B2 | 11/2015 | Grochowski et al. | |
| 9,904,580 B2 | 2/2018 | Mealey et al. | |
| 10,565,024 B2 * | 2/2020 | Dice | G06F 9/524 |
| 11,646,987 B1 * | 5/2023 | Pathak | H04L 51/212 709/206 |
| 2002/0199001 A1 * | 12/2002 | Wenocur | H04L 69/329 709/227 |
| 2004/0187122 A1 * | 9/2004 | Gosalia | G06F 9/5016 718/100 |
| 2007/0261057 A1 * | 11/2007 | Dearth | G06F 9/526 718/104 |
| 2008/0244578 A1 * | 10/2008 | Yoav | G06F 9/545 718/100 |
| 2012/0144396 A1 * | 6/2012 | Bohrer | G06F 9/4843 718/103 |

(Continued)

OTHER PUBLICATIONS

Suspending Threads, (Web Page), Retrieved Apr. 1, 2021, 1 Pg.

*Primary Examiner* — Hiren P Patel
(74) *Attorney, Agent, or Firm* — Yao Legal Services, Inc.

(57) ABSTRACT

Examples for handling ownership of process threads include acquiring ownership of a set of process threads to assign ownership of a subject process thread to an ownership agent. In some examples, acquiring ownership may include acquiring ownership of process threads with a wait event. During acquiring ownership of the set of process threads, one or more process threads that are acquired may be released to attend to an event that has occurred. A thread coordinator that handles ownership during acquiring phase may release and rebid one or more process threads. Upon acquiring all the process threads, the ownership of the subject process thread is assigned to an ownership agent. With a set of ownership conditions, the process threads are acquired efficiently within reduced time and with reduced deadlocks.

20 Claims, 6 Drawing Sheets

(56) References Cited

U.S. PATENT DOCUMENTS

| | | | |
|---|---|---|---|
| 2015/0347178 A1* | 12/2015 | Magee | G06F 1/3206 |
| | | | 718/103 |
| 2016/0188441 A1* | 6/2016 | Chen | G06F 11/3624 |
| | | | 717/127 |
| 2018/0253315 A1* | 9/2018 | Norton | G06F 9/5033 |
| 2019/0171482 A1* | 6/2019 | Wen | G06F 9/5027 |

* cited by examiner

HANDLING OWNERSHIP OF PROCESS THREADS

BACKGROUND

Generally, an operating system may act as an interface between user, and hardware and software resources. The operating system performs various tasks including process management, thread management, etc. Certain operating systems may be without an interruptible system call. Mission-critical systems may be one of the examples that incorporate such operating systems. These systems have an operating system that is capable of leveraging the capabilities of associated hardware. The mission-critical systems are popular as they serve industry needs related to critical applications that require high availability among other features. The mission-critical operating system may be used without an interruptible system call.

BRIEF DESCRIPTION OF DRAWINGS

The present subject matter, in accordance with one or more various examples, is described in detail with reference to the following figures. The figures are provided for purposes of illustration only and merely depict examples, wherein.

DETAILED DESCRIPTION

Generally, operating systems including mission-critical operating systems may run processes. Systems with the mission-critical operating system may include hardware resources such as a processor, memory, etc. The operating system may be capable of managing and utilizing the hardware resources to run certain programs or applications. Each program/application may consist of one or more processes. Further, a process thread may be considered as a basic unit of processor utilization. The process may be constituted by one or more process threads. Each operating system may have a different mechanism of handling ownership of process threads. For example, a mission-critical operating system comprises a process thread-ownership mechanism for assigning ownership of a process thread to an ownership agent. The ownership agent may obtain management control on the process thread upon obtaining its ownership. For example, a piece of operating system logic or an ownership agent may request the ownership of a process thread, by declaring an "ownership event." The ownership agent may own (e.g., obtain management rights) the process thread until its control is relinquished. The ownership mechanism may avoid a race between various ownership agents to manage ownership of a process thread.

Further, managing a multi-threaded process may require granting management ownership of all the process threads associated with a process to an ownership agent. When one or more process threads associated with a process may not be suspended, while another associated process thread is being managed by an ownership agent, the state of the latter may change. This may occur due to the sibling process threads within a process that may be sharing memory. Such shared memory may be modified when at least one process thread is free to run. In some circumstances, this presents a difficulty in managing the process as a whole. A process thread gathering may be used to put all sibling process threads within a process in a suspended state.

When a process thread meets certain ownership conditions, then the process thread may be suspended, and its ownership may be assigned to an ownership agent. However, certain process threads may not be immediately available for ownership transfer. For example, a process thread may be in a wait condition whereby it is put to sleep for a specified amount of time or till a specific event occurs. Moreover, a process thread with a wait event may be implemented in a privileged mode of the operating system. In other words, the process thread, which is in the wait condition, is considered to be running in a privileged mode (privileged system code) until it is woken up by a return condition of the wait event. Until the return condition associated with a process thread occurs, it may stay in the privileged mode. In certain conditions, the return condition may not occur for a long time or may not occur at all, which may create a dead-lock condition. In some instances, the process thread may stay in the privileged mode for an unbounded time, causing an unbounded delay in owing the process thread for management or other system processes.

Process threads may be gathered when they exit the privileged mode because in the privileged mode, certain process threads may be holding onto some shared or critical resources of the system that are yet to be released. Thus, the gathering of the process threads is performed when it may be considered safe to gather/suspend the process threads. To this end, certain management activities require all sibling process threads that are associated with a subject process thread (subject of an ownership event) to be suspended. Each of the sibling process threads may be running in different operational states or owned by ownership agents that are working on them. In various examples, 'process thread' may be a basic unit of work or execution. A process may include one or more process threads. In a process with multiple process threads, a process thread, which is subject of ownership, may be referred to as 'subject process thread.' All remaining process threads that belong to the same process may be referred to as 'sibling process threads,' with reference to the subject process thread.

The process of gathering and suspending process threads becomes sophisticated as the gathering of some process threads may be delayed affecting the management activity. For example, multiple process threads may be in a wait condition and a privileged mode, because of which gathering/suspending of the process threads may not take place. Management control over such waiting process/process thread may not resume until such process has exited the privileged waiting mode. Further, certain operating systems may have interruptible and non-interruptible system calls. Non-interruptible system calls present a difficulty in process and thread management with potentially unbounded amount of time it takes to obtain the ownership of a whole process for management purposes. In some examples, unless all of the sibling process threads are gathered and suspended, any management action on the subject process thread is not performed. Since multiple process threads may be in such wait conditions, gathering all the process threads might take a longer time. Moreover, an ownership condition associated with some process threads may not occur. For example, a process thread may wait for an input-output wait event that might not occur. With multiple sibling process threads, such circumstances (e.g., waiting for a return condition) may cause unbounded delay conditions, which may affect an ownership event and consequentially impact system performance. Thus, it may be desirable to address the aforementioned shortcomings.

Accordingly, various examples of handling ownership of process threads in certain operating systems are disclosed herein. Techniques described herein may enable obtaining ownership of a subject process thread and an associated sibling thread in a less amount of time by reducing/eliminating delay conditions. For example, certain process threads operating in various operational conditions that do not allow gathering and suspending earlier may now be gathered and suspended based on a set of ownership conditions.

In some examples, certain management processes require gathering and suspending process threads associated with a process thread group. The gathering and suspending process includes release and rebid of process threads. In some examples, a thread coordinator that implements the gathering step and acts as an intermediate ownership agent is assigned with ownership of all the process threads of a process thread group based on a set of ownership conditions. The present subject matter enables process threads, which may be in a privileged mode or waiting for an event—to be gathered. Further, to suspend the gathered process threads and assign ownership to the thread coordinator. The thread coordinator is configured to transfer ownership of a subject process thread to an ownership agent, for which an ownership event was raised, upon completion of gathering process by the thread coordinator.

The thread coordinator enables process threads to attend to any wait event that has occurred, during the gathering phase of the process threads associated with a process thread group. The examples described herein efficiently utilize the gathering phase to release certain process threads to attend to wait events that have occurred. In some examples, a process thread with a wait event may satisfy an ownership condition whereby the ownership is assigned to the thread coordinator. When gathering of other process threads is taking place, then the process thread which has a wait event that has occurred, is released. The ownership of released process threads is again requested/rebid by the thread coordinator. Other features and advantages of the present subject matter are discussed in the following description in conjunction with the drawings.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N".

The figures are not necessarily to scale, and certain parts and features may be schematically illustrated in the examples shown. Moreover, the drawings provide examples and/or implementations consistent with the description; however, the description is not limited to the examples and/or implementations provided in the drawings.

In the description, the use of the term "a," "an", or "the" is intended to include the plural forms as well, unless the context indicates otherwise. Also, the term "includes," "including," "comprises," "comprising," "have," or "having" when used in this disclosure specifies the presence of the stated elements, but does not preclude the presence or addition of other elements.

Figure 1:
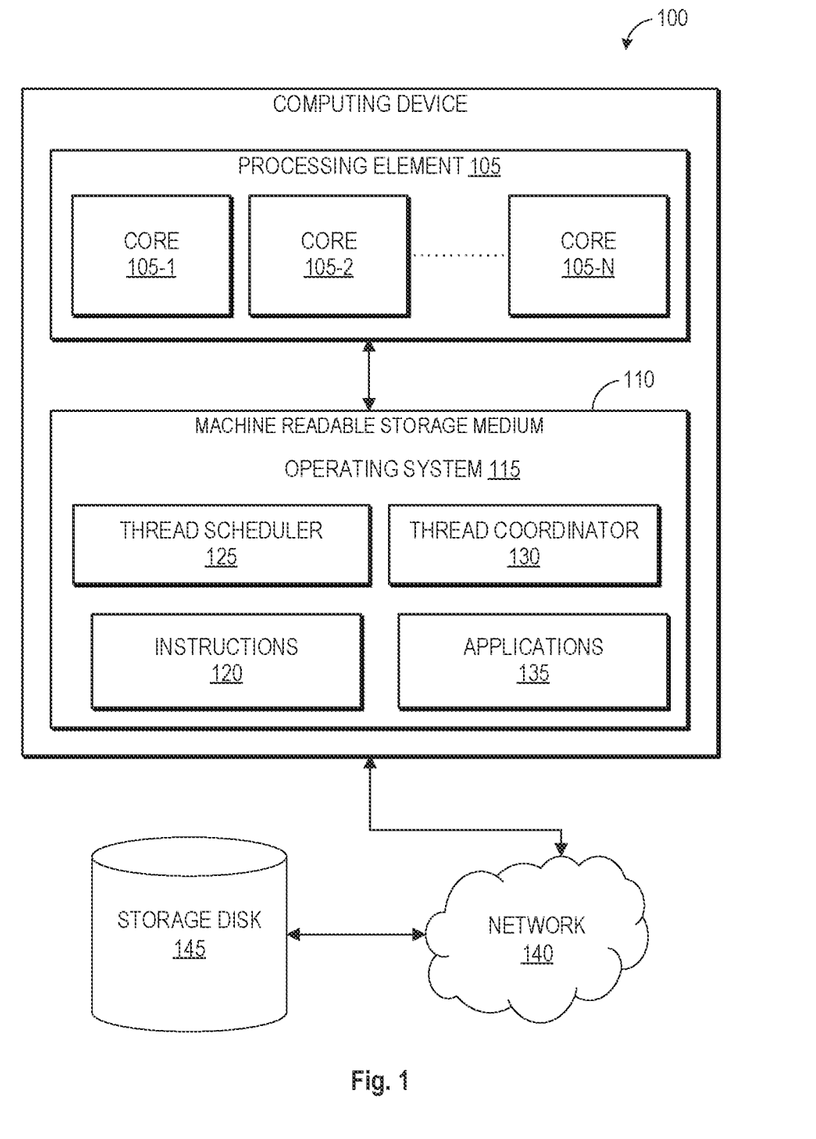
FIG. 1 illustrates an example computing device, in accordance with the present subject matter.

FIG. 1 illustrates an example computing device 100 for handling ownership of process threads, in accordance with the present subject matter. The computing device 100 comprises a processing element 105 coupled to a machine-readable storage medium 110 (hereinafter, referred to as 'storage medium' for brevity). The storage medium 110 comprises at least one operating system 115. The computing device 100 comprises a set of instructions 120 that are stored in the storage medium 110 or stored in a storage disk 145. The set of instructions 120 may be associated with a program that is stored in the storage disk 145. In one example, the storage disk 145 may be part of the computing device 100. In other examples, the storage disk 145 may be disposed outside the computing device 100 and is connected to the computing device 100 through a network 140. The network 140 may be a wired or a wireless network. In some examples, the storage medium 110 may comprise one or more applications 135.

Further, the processing element 105 may include a single-core or a multi-core processing element. The multi-core processing element may comprise a plurality of cores 105-1, 105-2, . . . , 105-N. The processing element 105 may execute one or more processes (process thread groups) corresponding to the applications 135. Further, each process may run one or more process threads. In one example, a process thread may function as a basic unit of execution within a process. The process threads belonging to a process may share resources associated with the process. For example, the shared resources may include, but are not limited to, a shared library, a memory, and a virtual address space.

Further, the operating system 115 comprises a process thread scheduler 125 for scheduling execution of the process threads on the processing element 105. In some examples, the process thread scheduler 125 may be part of a kernel of the operating system 115. For example, the kernel may be capable of managing the operation of resources such as processing element 105, etc. In some other examples, the process thread scheduler 125 may be executed by software and/or hardware layers of the computing device 100. The operating system 115 may include a thread coordinator 130 that acts as an intermediate ownership agent for handling ownership of the process threads. In some examples, the set of instructions 120 may include instructions for handling (gathering/suspending) ownership of the process threads by the thread coordinator 130 before transferring ownership to an ownership agent for which an ownership event was raised.

Figure 2:
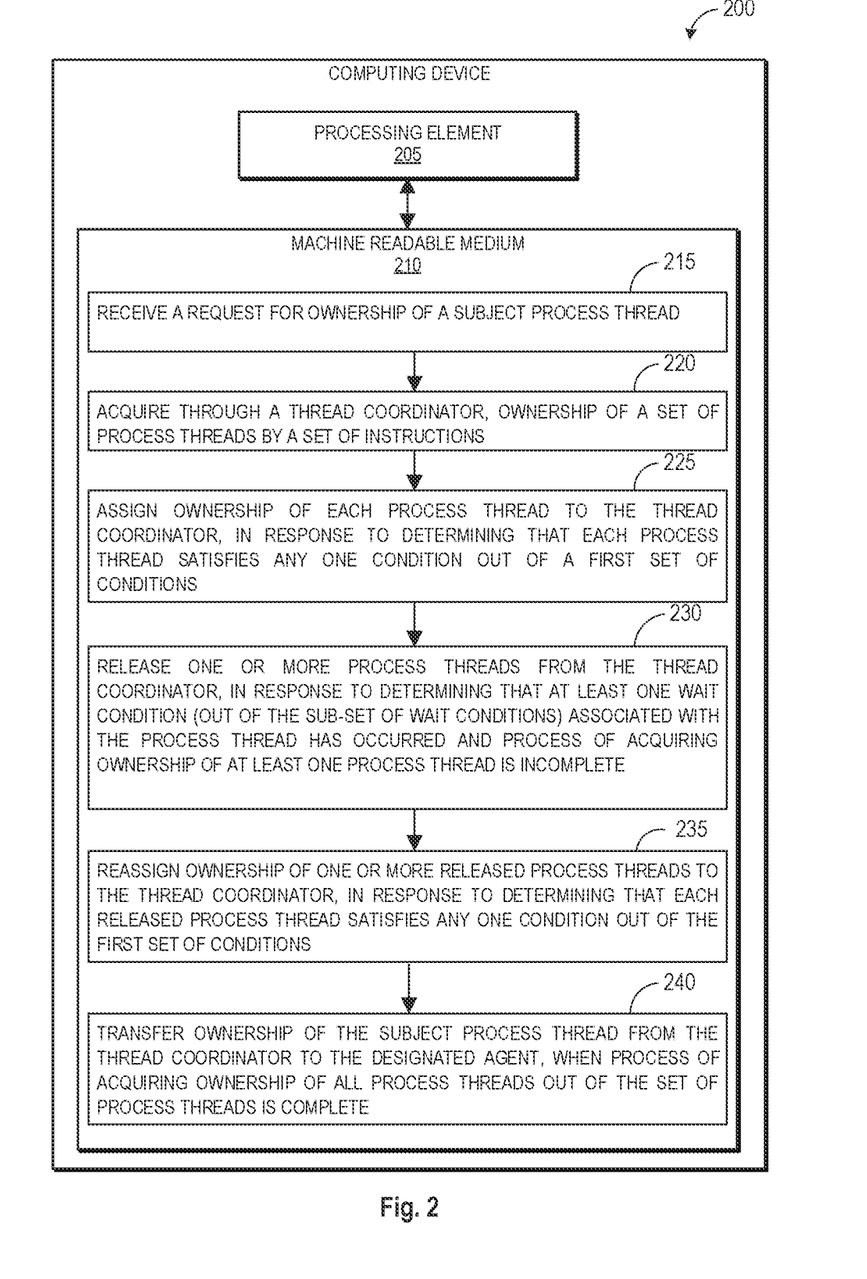
FIG. 2 illustrates a schematic block diagram of an example computing device, in accordance with the present subject matter.

FIG. 2 illustrates a schematic block diagram of an example computing device 200, in accordance with the present subject matter. The computing device 200 includes a processing element 205, and a machine-readable storage medium 210 (for brevity, referred to as 'storage medium'). The storage medium 210 may be a non-transitory type and encoded with a set of instructions that are executable, for example, instructions 215-240, for handling ownership of process threads. Further, although the instructions shown in FIG. 2 are in order, the instructions may be performed in any other order at any time and may be performed repeatedly, and by any suitable device or devices.

The processing element 205 may fetch, decode, and execute the instructions 215 to, request for ownership (ownership request) of a subject process thread that may be raised or declared by a part of an operating system. Declaration of the ownership event on a target process thread i.e., subject process thread, may pause the subject process thread based on at least one of a set of predefined conditions being satisfied. The subject process thread may be part of a multi-threaded process, and the subject process thread comprises one or more sibling process threads. As used herein, all the process threads associated with the process are collectively referred to as 'set of sibling process threads.' In some examples, the request for ownership of the subject process thread may be a bid by declaring an ownership event. The 'ownership event' may be associated with an ownership agent. In the case of more than one ownership event, an ownership agent associated with a highest priority ownership event may be considered for ownership.

The processing element 205 may fetch, decode, and execute the instructions 220 to, acquire ownership of a set of process threads by the thread coordinator, by execution of one or more further instructions. The set of process threads include the subject process thread and the sibling process threads, which are associated with the subject process thread. In one example, one or more of the following instructions enable acquiring ownership of the set of process threads.

The processing element 205 may fetch, decode, and execute the instructions 225 to, assign ownership of a process thread to the thread coordinator, in response to determining that the particular process thread satisfies any one condition out of a first set of ownership conditions. In some examples, an implementation code may check each process thread (out of the set of process threads) if they satisfy any one condition out of the first set of ownership conditions for assigning ownership. The implementation code may be part of the operating system, as per one example. The first set of ownership conditions may include a sub-set of wait conditions. The first set of ownership conditions include a non-privileged OR wait event (hereinafter, interchangeably referred to by "non-priv-OR-wait"). The sub-set of wait conditions includes the aforementioned "wait event," wherein a process thread waits for an event to occur. In one example, a process thread waiting for an event may stay in a sleep state and is awoken when the wait event occurs.

The processing element 205 may fetch, decode, and execute the instructions 230 to, release one or more process threads, which are owned by the thread coordinator, in response to determining that at least one wait event associated with the process thread has occurred. In some examples, the thread coordinator may be notified about the occurrence of a wait event corresponding to an already owned process thread. The thread coordinator may release such one or more process threads, in response to receiving or being notified about the occurrence of the wait event(s). For example, ownership of the process thread may be assigned to the thread coordinator based on any one condition out of the first set of ownership conditions associated with the desired ownership event have been satisfied, and wait event for which the process thread has been waiting is yet to occur.

Whereas, when the process thread is owned by the thread coordinator and a wait event for which the process has been waiting has occurred. Then, the particular process thread is released to handle the wait event that has occurred. At the same time, the release of the particular process thread may be permitted, when acquiring (acquisition of) ownership of at least one process thread may be incomplete/pending. Examples of occurrence of a wait event may include the expiry of a timer associated with a wait event, the occurrence of a system event being waited upon, etc. The thread coordinator bids or requests ownership of the released process threads. Thus, during the gathering phase of the process threads, the thread coordinator may perform the release and rebid of one or more process threads.

The processing element 205 may fetch, decode, and execute the instructions 235 to, reassign ownership of one or more released process threads to the thread coordinator, based on a condition that the one or more released process threads (each) satisfy any one condition out of the first set of ownership conditions. The implementation code may check each of the released process threads if it satisfies any one condition out of the first set of ownership conditions. In one example, upon reacquiring ownership of the set of process threads, which includes the released process threads, the thread coordinator may suspend the further release of any of the process threads. By this, the thread coordinator completes acquiring ownership of the set of process threads.

The processing element 205 may fetch, decode, and execute the instructions 240 to transfer ownership of the subject process thread from the thread coordinator to the ownership agent when the process of acquiring ownership of all process threads out of the set of process threads is complete. The ownership agent has exclusive management rights/access to the subject process thread and works on it. In some examples, the subject process thread may be queued onto a work queue of the ownership agent, as part of ownership transfer.

In some examples, the thread coordinator holds on to the sibling process threads and records any wait condition or other wait events that have occurred corresponding to any of the sibling process threads. However, the sibling process threads are not released till the management of the subject process thread lies with the ownership agent. Upon completion of execution of a management action/management logic on the subject process thread, the ownership agent releases the subject process thread to the thread coordinator. In some examples, the thread coordinator may relinquish ownership of the set of process threads, when no other ownership events are pending, and the process threads with any wait event that has occurred would proceed to handle the particular event.

In some other examples, the thread coordinator may notify the designated ownership agent currently owning the subject process thread to tentatively pause the management activity and let the thread coordinator release a sibling thread(s) associated with a wait event that has occurred. The thread coordinator rebids for the ownership of such released sibling threads so as to eventually gather them back and pass back the management control to the designated ownership agent to continue its management activity on the subject process thread.

FIGS. 3A-3H illustrate various schematic views illustrating handling ownership of process threads, in accordance with the present subject matter. A bid/request for ownership for a subject process thread may be raised by declaring an ownership event. The ownership event may correspond to a first ownership agent and the ownership event may be declared by a portion of a system code. In some examples, multiple ownership events for a subject process thread may be declared, and the multiple ownership events corresponding to different ownership agents. Such requests would be pending and at any instance, only one ownership agent may have exclusive control over the subject process thread. The ownership event with the highest priority may be considered for ownership when a plurality of ownership events are raised by a plurality of ownership agents.

Figure 3A:
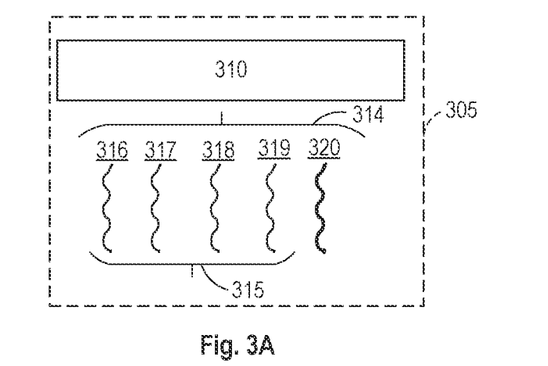
FIG. 3A illustrates a schematic view of a process and a set of process threads, in accordance with an example of the present subject matter.

In the illustrated example of FIG. 3A, a subject process thread 320 may belong to a process thread group/process 305. Further, in some examples, the subject process thread 320 may include sibling process threads 315. All the process threads associated with the process 305 are collectively referred to as a set of process threads 314. The set of process threads 314 may have one or more common resources 310. Further, certain ownership events may require all the sibling process threads 315 of the subject process thread 320 to be suspended before the first ownership agent 360 (shown in FIG. 3G) may work on the subject process thread 320 or may maintain management ownership/control over the subject process threads 320. The set of process threads 314 are gathered and suspended and then the ownership of the subject process thread 320 is assigned to the first ownership agent 360.

Figure 3B:
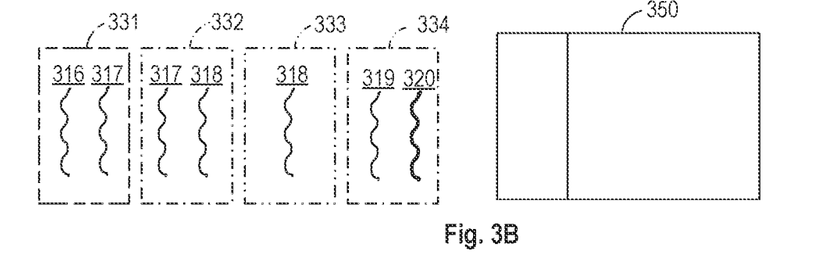
FIGS. 3B-3F illustrate schematic views of examples of handling ownership of process threads, in accordance with the present subject matter.

As illustrated in FIG. 3B, each process thread may be running in a different state or owned and managed by various ownership agents. For ease of representation, the set of process threads 314 are sorted in buckets 331-334 representing operating conditions. For example, bucket 331 indicates privileged mode, bucket 332 indicates wait condition, bucket 333 indicates non-privileged mode, and bucket 334 indicates immediately ownable/suspendable. For brevity, reference signs of buckets may be used for the corresponding mode. Some process threads may be listed in two or more buckets if they qualify that particular conditions. In some examples, the immediately ownable may include a process thread to be in a dispatchable condition (not waiting for an awake event), a non-privileged mode, without any locks (and not contending for a lock), and not owned by any ownership agent. An implementation code may check the operating condition of each process thread associated with the process 305.

Figure 3C:
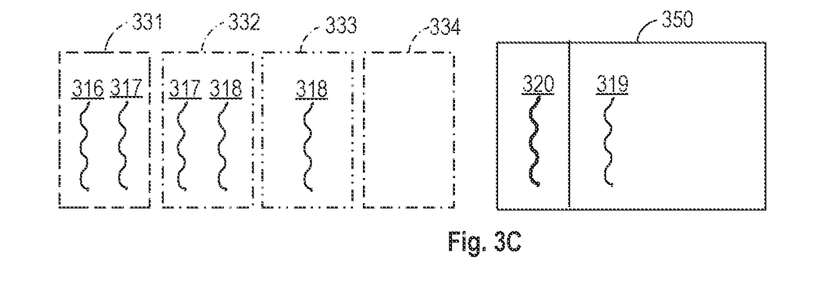

In the illustrated example of FIG. 3B, a process thread 316 is in privileged mode 331. Process thread 317 is in wait condition 332 and privileged mode 331. Process thread 318 is also in wait condition 332 but in non-privileged mode 333 (e.g., exited privileged mode). Process threads 319 and 320 are in immediately ownable 334. In the current example, the two-process threads, i.e. sibling process thread 319 and subject process thread 320, are in an immediately ownable, listed in bucket 334. In one example, the first set of ownership conditions may include the immediately ownable mode. The ownership of these two-process threads 319 and 320 is transferred to the thread coordinator 350, as illustrated in FIG. 3C, based on determining that they satisfy any one condition out of the first set of conditions. The two-process threads 319 and 320 that are gathered by the thread coordinator 350 are suspended and not scheduled for execution. Further, a check may be done to determine if any of the process threads are in a non-privileged OR wait condition/ mode.

Figure 3D:
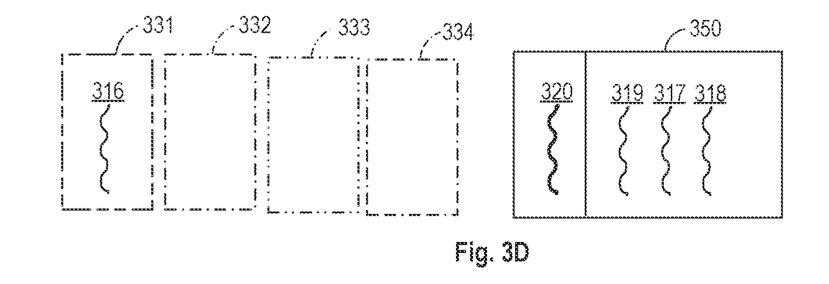

Further, as illustrated in FIG. 3C, both the process threads 317 and 318 satisfy the non-priv-OR-wait condition, i.e., process thread 317 is in non-privileged mode and process thread 318 is in a wait condition. The ownership of the process threads 317 and 318 is assigned to the thread coordinator 350, as illustrated in FIG. 3D. For ease of explanation, the check for immediately ownable condition and non-priv-OR-wait condition are illustrated separately. However, in one example, the first set of ownership conditions includes immediately ownable condition, non-priv-OR-wait condition, etc. and the check may be done simultaneously.

In some examples, various conditions of a process thread may be evaluated or determined at different opportune moments depending on the running context of the process thread. For example, a process thread upon completing execution of the privileged routine returns to user mode from the privileged mode. The process thread may have exited the privileged mode or is in non-privileged mode and satisfies any one condition out of the first set of ownership conditions (e.g., non-priv-OR-wait). The ownership of that particular thread is assigned to the thread coordinator 350.

In some examples, a process thread that is in a wait condition is considered to be waiting in the privileged mode. The ownership event may require the process thread to be in a non-privileged mode to transfer ownership. In the present subject matter, the first set of ownership conditions include a non-priv-OR-wait condition that enables acquiring ownership of the process threads that are in a non-privileged mode or with a wait condition, except the process threads that are exclusively running in privileged mode. For example, the process threads 317 and 318 satisfy at least one condition out of the first set of ownership conditions, and the thread coordinator 350 acquires ownership of the process thread 317 and 318. Moreover, the information related to the wait event for which the process threads 317 and 318 are waiting is retained.

Figure 3E:
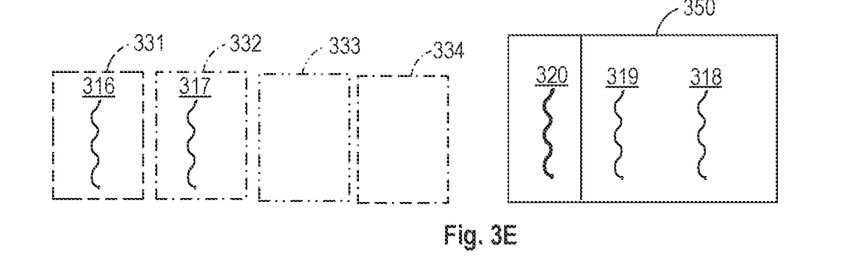

As illustrated in FIG. 3E, during the process of gathering and suspending the sibling process threads, if the wait event corresponding to the process thread 317 has occurred. Based on the condition that the gathering of one or more of the process threads is pending (in the current example, gathering of the process thread 316 is pending), the thread coordinator 350 releases the process thread 317 to attend to the event for which it was waiting. At the same time, the thread coordinator 350 rebids for the ownership of the released process thread 317, so as to obtain ownership again (subject to predefined conditions).

Figure 3F:
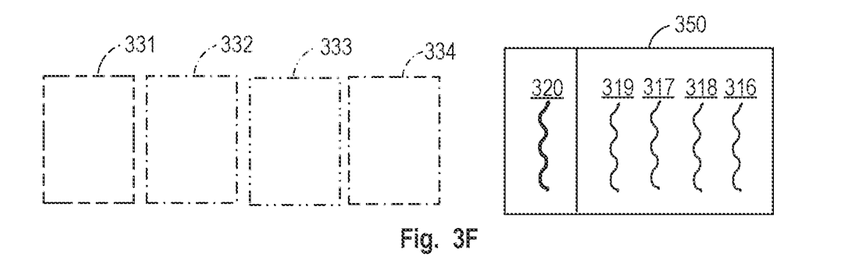

As illustrated in FIG. 3F, the process thread 316 may have satisfied any one condition of the first set of ownership conditions, whereby the ownership of the process thread 316 is assigned to the thread coordinator 350. For example, the process thread 316 may have exited the privileged mode and running in user mode or non-privileged mode. In one example, the process thread 316 may be waiting for input/ output operation to complete to exit the privileged mode. Further, the implementation code checks whether the released process thread 317 satisfies any one condition out of the first set of ownership conditions. Based on any one condition of the first set of ownership conditions being satisfied by the released process thread 317, the thread coordinator 350 reacquires ownership of the released process thread 317.

Figure 3G:
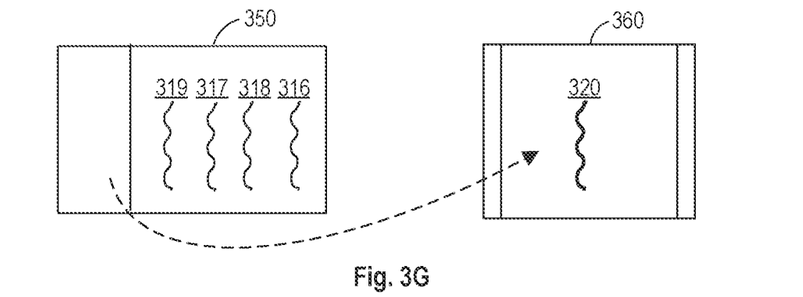
FIGS. 3G and 3H illustrate schematic views of examples of handling ownership of process threads by a thread coordinator, in accordance with the present subject matter.

As illustrated in FIG. 3G, upon acquiring ownership of the set of process threads 314, the thread coordinator 350 suspends the release of any of the process threads even when an associated wait event has occurred. The thread coordinator 350 transfers or assigns ownership of the subject process thread 320 to the first ownership agent 360 corresponding to which an ownership event was requested or bid. During the time for which the first ownership agent 360 is working on the subject process thread 320, the thread coordinator retains ownership of the sibling process threads 316-319.

Additionally, in some examples, by design (based on one or more design conditions), the thread coordinator 350 may be notified of the occurrence of wait events of one of the sibling process threads 316-319 while the first ownership agent 360 is working on the subject process thread 320. The first ownership agent 360 may tentatively suspend its management activity on the subject process thread 320 and transfer the ownership of the subject process thread 320 back to the thread coordinator 350. The thread coordinator 350 may then release those sibling process threads that are associated with any wait events that have occurred and rebids for ownership of these released sibling process threads. These released sibling process threads may proceed to handle the occurred event, for which they have been waiting for. Once these rebid sibling process threads have all been regathered by the thread coordinator 350, the thread coordinator 350 transfers the ownership of the subject process thread 320 to the designated ownership agent 360 to continue its management activity on the subject process thread 320. In some examples, the current condition is selectively provided based on the one or more design conditions and time limit target of how long the occurred waited events may be attended to.

Figure 3H:
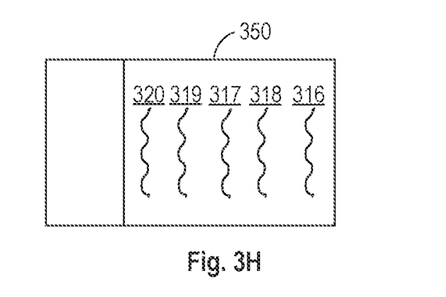

Further, as shown in FIG. 3H, once the first ownership agent is done with the subject process thread 320, it is released to the thread coordinator 350. The thread coordinator 350 may check if any ownership events are declared requesting ownership of any process thread out of the set of process threads 314. If an ownership event is available for any process thread, then that particular process thread for which the request/ownership event is raised may be considered as a subject process thread and the remaining process threads as the sibling process threads. The thread coordinator assigns ownership of the new subject process thread to a second ownership agent associated with the ownership event of the new subject process thread and holds on to the sibling process threads. Whereas, when no request for ownership corresponding to any of the ownership agents is pending, then the thread coordinator relinquishes ownership of all the set of process threads.

Figure 4A:
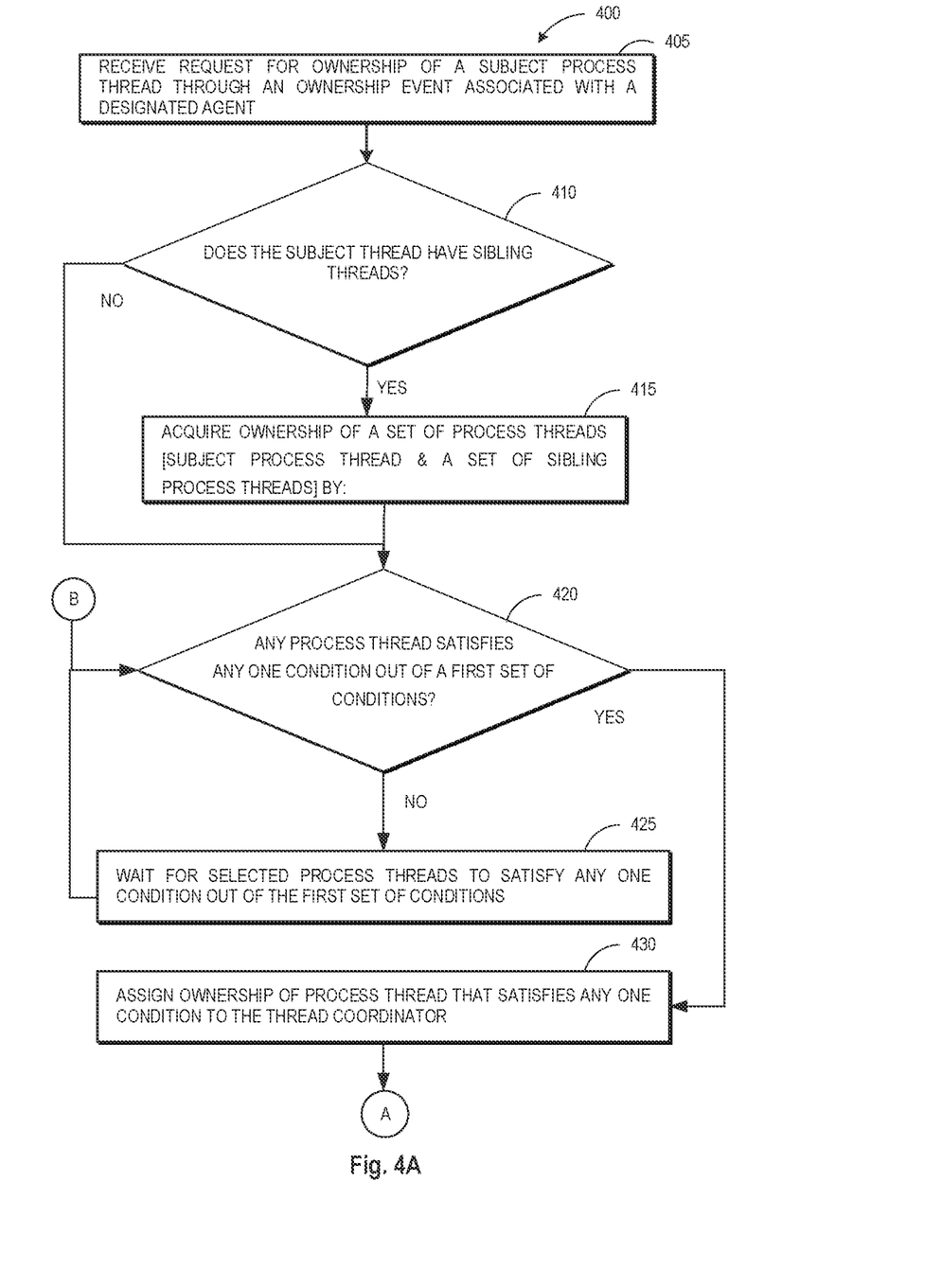
FIGS. 4A and 4B illustrate an example flow diagram corresponding to handling ownership of process threads, in accordance with the present subject matter.
Figure 4B:
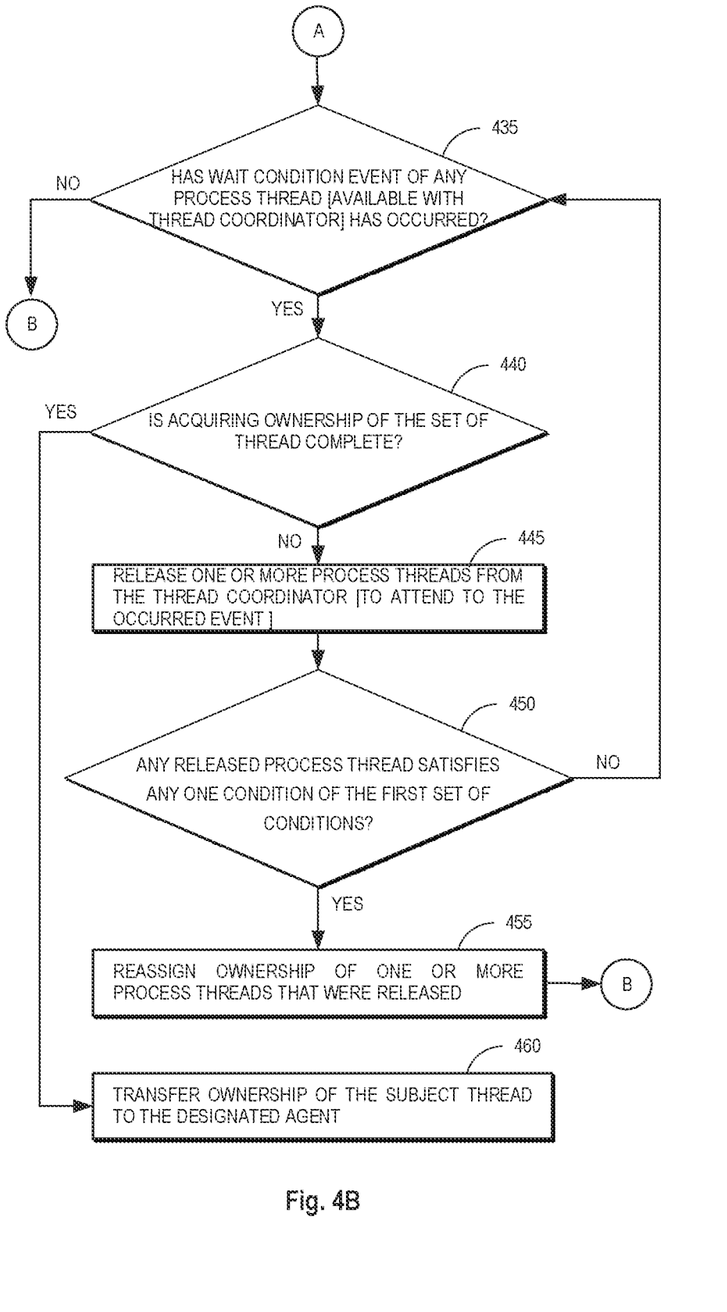

FIGS. 4A and 4B illustrate a flow diagram illustrating an example method 400 of handling ownership of process threads in greater detail. A computing device starts by starting an initialization process during bootup. The initializing process may be referred to as a daemon process. The computing device may execute one or more generic and/or specific programs or applications. During certain management processes, a system library or a system process may require a set of process threads to be gathered and suspended before performing ownership transfer of a subject process thread to an ownership agent. The flow diagram illustrates an example method for gathering and suspending the set of process threads with improved handling of ownership.

At 405, a request for ownership of a subject process thread may be raised through/by declaring an ownership event associated with an ownership agent. A current instance of the ownership agent is referred to as 'first ownership agent.' In some examples, ownership may be bid (ownership event) by more than one ownership agent. In some examples, a portion of the system code may request/bid the ownership event. Ownership events may be based on conditions such as the process thread being dispatchable, without locks, in non-privileged mode, a relative priority of events, a registered agent (default handler for a given event), etc. In such cases, based on a set of event priorities, an ownership agent with the highest event priority may be considered for assignment of ownership. In some examples, an implementation code running on a processing element may at least partially handle the ownership event and assignment of ownership. In one example, a thread coordinator may be an intermediate ownership agent or management agent. The thread coordinator and the implementation code may be part of an operating system of the computing device. For example, the implementation code may be a library code such as a Millicode that may implement lower-level APIs to the processing element. In some examples, ownership of the set of process threads is assigned to the thread coordinator by the implementation code. Further, for gathering the set of process threads, the thread coordinator bids/requests for the ownership of the process threads.

At 410, a check may be performed to determine if the subject process thread comprises any sibling process threads. For example, in case of a multi-threaded process, it is determined that the subject process thread comprises sibling process threads. As explained earlier, certain management processes require the sibling process threads to be suspended in order to execute the management process without any disruption from any of the sibling process threads. For example, the set of process threads associated with a process may have access to a common set of resources such as data, files, etc. Therefore, the sibling process threads if not gathered and suspended, may access these common set of resources thereby interrupting the management process.

At 415, acquiring ownership of the set of process threads is performed between 420-455. For example, at 420, each process thread is checked whether it satisfies any one condition out of a first set of ownership conditions. In other words, a check is done to determine if any process thread satisfies any one condition out of a first set of ownership conditions. A process thread that is in a wait condition (privileged/non-privileged mode) or running in a non-privileged mode may satisfy the condition for ownership. In one example, the process thread upon exiting a privileged mode and be running in a user-mode/non-privileged mode satisfy the condition for ownership. In further examples, process threads that are in an immediately ownable mode/condition may also satisfy the ownership condition. The process threads that satisfy any one condition out of the first set of ownership conditions are eligible for gathering and suspending. Further, one or more process threads may not satisfy any condition out of the first set of ownership conditions. In other example, the target process thread is single-threaded, based on the determination of at 410. In such instances, ownership of the target process thread (i.e., the subject process thread) may be granted to the designated agent directly or through the thread coordinator.

At 425, as per one example, the implementation code running on the processing element may wait for one or more selected process threads to satisfy any one condition out of the first set of ownership conditions. Whereas, based on a condition that, at 420, selected process threads satisfy any one condition out of the first set of ownership conditions, the ownership of that selected process threads is assigned to the thread coordinator, at 430. In further examples, the first set of ownership conditions include, but are not limited to, a process thread running in non-privileged mode, a process thread being stoppable, a process thread being in a process thread-lifecycle that allows the process thread to be owned, a subject process thread reaching a point that it is considered to be terminated, and Portable Operating System Interface (POSIX) signals are temporarily disallowed.

During gathering and suspending of the process threads, at 435, a check is performed to determine whether any wait condition associated with a process thread, which is available with the thread coordinator, has occurred. In other words, during the process of gathering the process threads, if a wait event associated with gathered process threads has occurred. The thread coordinator is notified about the wait event that has occurred. Whereas, at 435, if any wait condition associated with the process thread has not occurred, then in some examples, the system may continue to check whether any pending process threads satisfy any one condition out of the first set of ownership conditions to grant ownership to the thread coordinator. Whereas, at 435, if a wait condition associated with a process thread owned by the thread coordinator has occurred, then either simultaneously or subsequently, at 440, a check is performed whether acquiring ownership of the set of process threads is complete.

In some examples, the check at 435 is performed in one or more of the following examples. A process thread that is owned by the thread coordinator may be in a running state or ready-to-run state. The ready-to-run state may imply that the process thread does not have execution time of the processor and upon obtaining execution time it may run. The process thread may run until a change in state of the process thread. During such change in state, the check is performed to determine whether any wait condition associated with the process thread. For example, a process thread may have finished the execution of privileged system code and returning to its user code. During such change in state, the check may be performed if the particular process thread has any pending ownership events, say non-privileged mode in the current example. In such conditions, the particular process may be released.

In another example, a process thread may call a privileged system wait function. The process thread might be being put to sleep to wait for some wait events. During such conditions, the check may be performed to determine if any ownership bids are pending with a non-priv-OR-wait condition, as per one example.

Based on the condition that the wait event associated with a particular process thread has occurred and acquiring ownership of the set of process threads is not complete, at 440, the particular process thread is released from the thread coordinator, at 445. Further, the thread coordinator rebids or requests ownership for all the released process threads. The released process thread attends to the event for which it is waiting. Further, in some examples, the release of the process thread may be handled by the implementation code and the process thread may return to an operational state it was in prior to the transfer of ownership. For example, wait event information associated with the process thread is also retained. When released, the process thread is capable of attend to the event that has occurred. In some examples, the particular process thread being in a privileged mode and currently not in waiting mode, may take a short duration to complete the execution and exit the privileged mode or may get into another wait condition. Upon entering into another wait condition, the particular released process thread may satisfy a non-priv-OR-wait condition out of the first set of ownership conditions.

In some examples, a process thread is queued onto an ownership queue of the thread coordinator when its ownership is acquired. Further, when a wait event corresponding to a process thread has occurred, then that process thread is re-queued onto the ownership queue of the thread coordinator. The thread coordinator identifies that particular process thread that it has already owned. The thread coordinator may determine that the particular process thread was in a non-priv-OR-wait condition and the associated wait condition has occurred. The thread coordinator may release the process thread based on a condition that the process of acquiring (gathering and suspending) one or more process threads is still pending. For example, the occurrence of await event may include an expiry of a timer for a wait or a system event being waited upon has occurred. The thread coordinator bids, or requests ownership of the released process thread and this action may be referred to as rebid or reacquire. Further, the process threads are returned to an operational state that they were in, prior to acquiring ownership by the thread coordinator. The one or more released process threads attend to respective associated wait events they were waiting for to occur.

At 450, a check is performed whether any of the released process threads satisfies any one condition out of the first set of ownership conditions, for assigning ownership of the particular process threads to the thread coordinator. In some examples, the check may be performed when a change in the state of the process thread is observed. The change in state may include exiting a privileged system code, a wait event is being processed, a process thread calling a privileged system wait function, etc. In one example, a released process thread may again enter into another wait condition or may satisfy any other condition out of the first set of ownership conditions. For example, the released process thread satisfies the non-priv-OR-wait condition thereby enabling assignment of ownership to the thread coordinator.

At 455 based on the condition that the released process thread satisfying any one condition out of the first set of ownership conditions, ownership of the particular released process thread is reassigned to the thread coordinator. In one example, the particular process thread may not have any other wait events. In another example, the particular process thread may be suspended but may wait on an event to occur. Further, a check may be performed to determine whether any of the process threads (pending to be assigned to the thread coordinator) satisfy any one condition out of the first set of ownership conditions.

Based on the condition that acquiring ownership of the set of process threads is complete (at 440), at 460, the transfer of ownership of the subject process thread to the first ownership agent is performed. Release of process threads (and rebidding of ownership) is performed till the gathering of ownership of any one process thread out of the set of the process threads is pending. Upon completion of the gathering/acquiring ownership of the set of process threads is complete, the thread coordinator suspends any further release of process threads. After the transfer of ownership of the subject process thread to the first ownership agent, the thread coordinator retains ownership of the sibling process threads.

Upon completion of work on the subject process thread, the first ownership agent relinquishes ownership (ownership release) of the subject process thread and the ownership of the subject process thread is assigned to the thread coordinator. The implementation code may check for any pending ownership events for any of the process threads from the set of threads held by the thread coordinator. Based on priority, a pending ownership event may be considered. For example, the pending ownership event may be associated with a second ownership agent. Ownership of a new subject process thread (corresponding to the pending ownership event) is assigned to the second ownership agent. The thread coordinator holds on to the ownership of the sibling process threads till the second ownership agent works on the new subject process thread. Whereas, when the first ownership agent relinquishes ownership of the subject process thread and no further pending ownership events are available, then the thread coordinator relinquishes ownership of the set of process threads.

In some examples, a predefined category of management process may include debugging session of a process/process thread group. In such a predefined category of the management process, the thread coordinator may initiate acquiring ownership of the process threads but suspends the release of process threads (during the gathering process) even when an associated wait event has occurred. For example, debugging session may require the process threads to be in the same state without any changes. In such conditions, the release and rebid/reassign of the process threads are suspended. In one example, the operational code may suspend the release of one or more process threads based on determining that a current management process belongs to the predefined category of a management process.

In further examples, a portion/section of the operating system code may be marked as critical. Method 400 may include suspending at least one condition from the first set of conditions. In a preferred example, the non-priv-OR-wait condition may be suspended, when a target process thread is executing such a section of code that is marked as critical. In such instances, ownership of the target process thread is not assigned to the thread coordinator. In some examples, suspending the non-priv-OR-wait condition may prevent any potential deadlocks. For example, if such a section of code has acquired a high-level scarce resource, due to be released at the end of the section of code, and such resource may be in demand between a time the designated agent has been granted the ownership of the target process thread and a time the designated agent is done with the target process thread. It may be ensured that no process thread is being gathered by the thread coordinator when executing such a marked section of code.

In some examples, the method 400 may be implemented by processing element(s) through any suitable hardware, a non-transitory machine-readable storage medium, or a combination thereof. In an example, the method 400 may be performed by machine-readable instructions, which include instructions stored on a storage medium and executable by a processing element, such as the hardware processor, of a computing device 100, 200. In some examples, processing element 105, 205 may be, one or multiple central processing units (CPUs), one or multiple semiconductor-based microprocessors, one or multiple graphics processing units (GPUs), other hardware devices suitable for retrieval and execution of instructions stored in a machine-readable storage medium, or combinations thereof. The processing element 105, 205 may be a physical device. Moreover, in one example, the processing element 105, 205 may include multiple cores on a chip, include multiple cores across multiple chips, multiple cores across multiple devices (e.g., if the computing device 100 includes multiple node devices), or combinations thereof. In some examples, the hardware processor may be part of a mission-critical system. The mission-critical system may be fault-tolerant, always-on, etc. that is deployed for mission-critical solutions.

Processing element 105, 205 may fetch, decode, and execute instructions 215-240 or 405-460 to implement handling ownership of process threads. As an alternative or in addition to retrieving and executing instructions, processing element 105, 205 may include at least one integrated circuit (IC), other control logic, other electronic circuits, or combinations thereof that include a number of electronic components for performing the functionality of instructions. A machine-readable storage medium may be any electronic, magnetic, optical, or other physical storage devices that contain or store executable instructions. Thus, machine-readable storage medium may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium may be a non-transitory storage medium, where the term "non-transitory" does not encompass transitory propagating signals.

The computing device also includes a main memory, such as random-access memory (RAM), cache, and/or other dynamic storage devices, coupled to the bus for storing information and instructions to be executed by the processing element. Main memory also may be used for storing temporary variables or other intermediate information during the execution of instructions by the processing element. Such instructions, when stored in storage media accessible to the processing element, render the computing device into a special-purpose machine that is customized to perform the operations specified in the instructions. The computing device further includes a read-only memory (ROM) or other static storage device coupled to the bus for storing static information and instructions. A storage device, such as a magnetic disk, optical disk, or Universal Serial Bus (USB) thumb drive (Flash drive), etc., is provided and to the bus for storing information and instructions.

The aforementioned elements may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables.

In general, the word "element," "system," "device," and the like, as used herein, may refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components for execution on computing devices may be provided on a machine-readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an Erasable Programmable Read-Only Memory (EPROM). It will be further appreciated that hardware components may be comprised of connected logic units, such as gates and flip-flops, and/or may be comprised of programmable units, such as programmable gate arrays or processors.

According to one example, the techniques herein are performed by computing device in response to processor(s) executing one or more sequences of one or more instructions contained in main memory. Such instructions may be read into main memory from another storage medium, such as storage device. Execution of the sequences of instructions contained in main memory causes processor(s) to perform the process steps described herein. In alternative examples, hard-wired circuitry may be used in place of or in combination with software instructions.

While certain examples have been shown and described above, various changes in form and details may be made. Certain features that have been described in relation to one example and/or method may be related to other examples. In other words, flow diagrams, methods, features, components, and/or properties described in relation to one example may be useful in other examples. Furthermore, it should be appreciated that the systems and methods described herein may include various combinations and/or sub-combinations of the components and/or features of the different examples described. Thus, features described with reference to one or more examples may be combined with other examples described herein.

I claim:

1. A method comprising:
receiving, by a processing element, an ownership request of a subject process thread through an ownership event corresponding to a first ownership agent;
acquiring, by the processing element, through a thread coordinator, ownership of a set of process threads, wherein the set of process threads includes the subject process thread and a set of sibling process threads associated with the subject process thread, wherein acquiring includes:
determining, by the processing element, that each of one or more process threads, out of the set of process threads, satisfy any one condition out of a first set of ownership conditions, wherein the first set of ownership conditions includes a sub-set of wait conditions, which causes the processing element to assign ownership of the one or more process threads to the thread coordinator;
determining, by the processing element, that at least one wait condition, out of the sub-set of wait conditions, associated with a process thread has occurred and that a process of acquiring ownership of at least one process thread is incomplete, which causes the processing element to release one or more process threads from the thread coordinator; and
determining, by the processing element, that one or more released process threads satisfies any one condition out of the first set of ownership conditions, which causes the processing element to reassign ownership of the one or more released process threads to the thread coordinator; and
transferring, by the processing element, ownership of the subject process thread from the thread coordinator to the first ownership agent, when process of acquiring ownership of the set of process threads is complete.

2. The method of claim 1, wherein the first set of ownership conditions include: an availability of a process thread in an immediately ownable condition, a process thread exiting a privileged mode, and a process thread waiting for an event to occur.

3. The method of claim 1, further comprises:
retaining, by the processing element, ownership of the set of sibling process threads with the thread coordinator during a time for which the first ownership agent maintains a management ownership over the subject process thread.

4. The method of claim 1, further comprises:
assigning, by the processing element, ownership of the subject process thread to the thread coordinator, when the first ownership agent releases ownership of the subject process thread.

5. The method of claim 4, further comprises:
retaining, by the processing element, ownership of the set of process threads with the thread coordinator; and
determining, by the processing element, whether one or more requests for any selected process thread, out of the set of process threads, is raised through ownership events corresponding to one or more ownership agents.

6. The method of claim 5, further comprises:
determining, by the processing element, that an ownership event for the selected process thread is corresponding to the second ownership agent, which causes the processing element to assign ownership of the selected process thread to a second ownership agent.

7. The method of claim 5, further comprises:
assigning, by the processing element, ownership of the selected process thread to a second ownership agent with a highest priority ownership event, out of one or more ownership events for the selected process thread raised by one or more ownership agents.

8. The method of claim 5, further comprises:
determining, by the processing element, that no ownership events for any process thread, out of the set of process threads, is pending, which causes the processing element to release ownership of the set of process threads from the thread coordinator.

9. The method of claim 1, wherein determining, by the processing element, that the at least one wait condition associated with the process thread has occurred, includes:
requeuing, by the processing element, the process thread on a work queue of the thread coordinator.

10. The method of claim 9, further comprises:
determining, by the processing element, that the one or more process threads are re-queued onto the work queue of the thread coordinator, which causes the processing element to release the one or more process threads from the thread coordinator.

11. A computing device comprising:
a hardware-based processing element; and
a machine-readable storage medium storing instructions that, when executed by the hardware-based processing element, cause the hardware-based processing element to:
receive an ownership request of a subject process thread through an ownership event corresponding to a first ownership agent;
acquire through a thread coordinator, ownership of a set of process threads, wherein the set of process threads includes the subject process thread and a set of sibling process threads associated with the subject process thread, wherein acquisition includes the hardware-based processing element to:
determine that one or more process threads, out of the set of process threads, satisfy any one condition out of a first set of ownership conditions, wherein the first set of ownership conditions includes a sub-set of wait conditions, which causes the hardware-based processing element to assign ownership of the one or more process threads to the thread coordinator;
determine that at least one wait condition, out of the sub-set of wait conditions, associated with each of the process threads has occurred, and that a process to acquire ownership of at least one process thread, out of the set of process threads, is incomplete, which causes the hardware-based processing element to release one or more process threads from the thread coordinator; and determine that one or more released process threads satisfies any one condition out of the first set of ownership conditions, which causes the hardware-based processing element to reassign ownership of one or more released process threads to the thread coordinator; and transfer ownership of the subject process thread from the thread coordinator to the first ownership agent, when process to acquire ownership of the set of process threads is complete.

12. The computing device of claim 11, wherein the release of one or more process threads from the thread coordinator, includes the hardware-based processing element to:

return the one or more process threads to an operational state that is prior to acquiring ownership by the thread coordinator, and the one or more process threads attend to respective associated wait events they were waiting for to occur.

13. The computing device of claim 11, further comprises:

an operating system and the operating system includes an implementation code run on the hardware-based processing element, wherein the implementation code checks whether any process thread, out of the set of process threads, satisfies any one condition out of the first set of ownership conditions.

14. The computing device of claim 13, wherein the first set of ownership conditions further includes at least one of a process thread in a dispatchable condition, a process thread without any locks, a process thread not owned by any ownership agent, a process thread in a non-privileged mode, and a process thread waiting for an event to occur.

15. A non-transitory machine-readable storage medium comprising instructions, the instructions executable by a processing element of a device to:

receive a request for ownership of a subject process thread through an ownership event associated with a first ownership agent;

acquire through a thread coordinator, ownership of a set of process threads, wherein the set of process threads includes the subject process thread and a set of sibling process threads associated with the subject process thread, wherein the instructions to acquire include instructions executable by the processing element to:

determine that one or more process threads, out of the set of process threads, satisfy any one condition out of a first set of ownership conditions, wherein the first set of ownership conditions includes a sub-set of wait conditions, which causes the processing element to assign ownership of the one or more process threads to the thread coordinator;

determine that at least one wait condition, out of the sub-set of wait conditions, associated with each of the one or more process threads has occurred and that a process to acquire ownership of at least one process thread, out of the set of process threads, is incomplete, which causes the processing element to release one or more process threads from the thread coordinator; and determine that one or more released process, threads satisfies any one condition out of the first set of ownership conditions, which causes the processing element to release one or more process threads from the thread coordinator; and transfer ownership of the subject process thread from the thread coordinator to the first ownership agent, when process to acquire ownership of the set of process threads is complete.

16. The non-transitory machine-readable storage medium of claim 15, wherein the sub-set of wait conditions include a wait for a timer and a wait for a system event to occur.

17. The non-transitory machine-readable storage medium of claim 15, wherein the instructions to receive the request for ownership of a subject process thread through the ownership event includes instructions to:

select an ownership event having highest priority, when a plurality of ownership events corresponding to a plurality of ownership agents are declared for a selected process thread.

18. The non-transitory machine-readable storage medium of claim 15, wherein the instructions to assign ownership of one or more process threads, out of the set of process threads, to the thread coordinator, includes instructions to:

queue the process thread onto a work queue of the thread coordinator.

19. The non-transitory machine-readable storage medium of claim 15, wherein the instructions to release one or more process threads from the thread coordinator, further includes instructions to:

suspend the release of one or more process threads, based on a determination that a current management process belongs to a predefined category of management process.

20. The non-transitory machine-readable storage medium of claim 15, further comprises instructions to:

determine, based on one or more design conditions, that at least one wait condition, out of the sub-set of wait conditions, associated with each of the one or more process threads has occurred, which causes the instructions to release one or more process threads from the thread coordinator and release the subject process thread to the thread coordinator; and determine that each released process thread, of the one or more released process threads, satisfies any one condition out of the first set of ownership conditions, which causes the instructions to reassign ownership of one or more released process threads to the thread coordinator and reassign ownership of the subject process thread to the first ownership agent.

* * * * *